(12) United States Patent
Kuschak

(10) Patent No.: US 6,742,079 B1
(45) Date of Patent: May 25, 2004

(54) FILE SYSTEM FOR AVOIDING LOSS OF DATA

(75) Inventor: Brian C. Kuschak, Mountain View, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 755 days.

(21) Appl. No.: 09/631,565

(22) Filed: Aug. 2, 2000

(51) Int. Cl.$^7$ ............................................... G06F 12/16
(52) U.S. Cl. ....................... 711/103; 711/155; 711/156
(58) Field of Search ................................. 711/115, 103, 711/155, 156

(56) References Cited

U.S. PATENT DOCUMENTS 6,415,350 B2 * 7/2002 Asoh ........................... 711/103

* cited by examiner

Primary Examiner—Reginald G. Bragdon
(74) Attorney, Agent, or Firm—David R. Gildea

(57) ABSTRACT

An MS DOS and MS WINDOWS compatible file system for avoiding loss of data in a memory unit if power is interrupted while new data is being written. The file system uses an ATA write command for erasing a data reserve sector and writing the modified data including the new data into the data reserve sector; erasing a control reserve sector and writing control data into the control reserve sector; erasing the intended operational sector and writing the modified data into the intended operational sector; and then uses an ATA erase command for erasing the control reserve sector. At power up or insertion of the memory unit, the control reserve sector is tested. If the control data is non-erased the host uses the copy of the modified data in the data reserve sector for replacing the data in the intended operational sector.

8 Claims, 3 Drawing Sheets

FILE SYSTEM FOR AVOIDING LOSS OF DATA

BACKGROUND OF THE INVENTION

1. Field of the Invention

The invention relates generally to file systems and more particularly to an MS DOS and MS WINDOWS compatible file system for avoiding loss of data in a memory unit if power is interrupted or the memory unit is removed while new data is being written.

2. Description of the Prior Art

Standard MICROSOFT (MS) disk operating system (DOS) and WINDOWS compatible memory plug-in units, known as a CompactFlash memory cards, are commercially available for MS DOS or MS WINDOWS compatible hosts. A CompactFlash memory card uses flash-type memory devices on the card for storing data that is generated by the host. For MS DOS and MS WINDOWS compatibility the memory card is formatted according to a standard MICROSOFT format specified by American National Standards Institute (ANSI)/International Standards Association (ISO)/International Electrotechnical Commission (IEC) 9293-1994. Once the memory card has been formatted, all communication between the host and the card uses a standard protocol known as the AT attachment (ATA) protocol. The basic ATA protocol is defined by ANSI specification X3.221.1994. Newer generations of the ATA protocol are also specified by ANSI. Currently, there are specifications for ATA-2 and ATA-3. ATA commands are available for reading, writing, and erasing sectors of data. Importantly, the ATA write command erases the data in a sector of data before it writes data to that sector. CompactFlash memory cards and an ATA protocol command subset recognized by the cards are described in a "CompactFlash Specification, Revision 1.4" copyrighted in 1997 by the CompactFlash Association of Palo Alto, Calif.

The ATA protocol and an ATA interface form the basis for enabling hosts using an 80×86 compatible processor and MS DOS and WINDOWS file system in the host to communicate with a great variety of different memory units such as the CompactFlash memory cards, personal computer memory card international association (PCMCIA) cards, and disk memories. Hard disk memories using the ATA protocol and interface are commonly referred to as integrated drive electronics (IDE) interface drives.

All ATA commands for reading, writing, and erasing operate on one or more sectors of data at a time. Sectors are linear blocks data of a selected size, typically 512 bytes. There is no way in the ATA protocol to read, write, or erase only a single particular data byte located in the memory unit. To read a particular data byte into the host, the ATA protocol uses the ATA read command to read the entire sector in the memory unit containing the particular data byte. Writing new data is more complex. To write a particular data byte into the memory unit the ATA protocol invokes the ATA read command to read the intended sector containing the particular byte into the host; modifies the data at the particular byte within the host; and then invokes the ATA write command. The ATA write command erases the entire sector in the memory unit containing the particular data byte, and then rewrites the entire sector with the modified data. There is no ATA compatible way to rewrite modified data without first erasing the entire intended sector.

If the memory unit is removed from the host or if power is lost in the host or memory unit while the ATA write command is processing, there is a high probability that the original, existing data in the sector will be corrupted. Typically, this problem is not often encountered with desktop hosts such as personal computers having memory units that are fixed in place such as hard disks. However, the problem can and does occur for removable memories in personal computers and can be a major problem for portable hosts such as digital cameras, palmtop computers, global positioning system surveyors, and the like. Such portable hosts commonly have plug-in memory units and removable batteries. It is a common practice to use multiple plug-in memory units one at a time in a portable host and to swap the plug-in memory units between the portable host and a desktop personal computer for additional processing of stored data. Removing the memory unit or the battery while an ATA write command is processing is likely to cause existing data in the intended sector to be corrupted. If the sector contains a directory or a file allocation table (FAT), then it is possible that the data in many or all sectors in the memory unit will be irrevocably lost.

One approach, known as journaling, is used in high reliability file systems for solving this problem. The journaling approach uses redundant write operations to the memory unit. Unfortunately, this approach is not generally available for memory units that are formatted for MS DOS or MS WINDOWS systems because all the sectors in the MS DOS and MS WINDOWS format are allocated for one purpose or another. When all the sectors that are allocated for data generated by the host application are in use, the redundant write operation has no memory space in which it can temporarily store redundant data without writing over existing data. Moreover, even when there is memory space available for temporary storage, if the memory unit is removed to a new MS DOS or MS WINDOWS host during the write process, existing data can be lost to the new host because the new host will not have any way to know the particulars of the redundant write process or what it should do with the data in temporary storage. Another approach stores backup data in the host until it is known that the write process is completed. However, this approach has two disadvantages. First, the host must have a backup power source, such as an internal battery or capacitor, capable of powering the host during the write process. Such backup power source adds to the cost and physical size of the host. Second, the new host has no access to the backup data.

There is a need for a low cost MS DOS and WINDOWS compatible file system using the ATA protocol for avoiding loss of existing data in a memory unit if power is interrupted or the memory unit is removed from the host while new data is being written to the memory unit.

SUMMARY OF THE INVENTION

It is therefore an object of the present invention to provide an MS DOS and WINDOWS compatible file system using the ATA protocol for avoiding loss of existing data in a memory unit if power is interrupted or the memory unit is removed or disconnected from the host while new data is being written to the memory unit.

Briefly, in a preferred embodiment, a system includes a host of the present invention and an AT attachment (ATA) compatible memory unit. The host includes an MS DOS or WINDOWS compatible file system of the present invention including an MS DOS and WINDOWS formatter, an ATA driver, and a file manager. The formatter formats the memory unit for normal operational sectors and special reserve sectors. The ATA driver uses standard ATA protocol commands for reading, writing, and erasing data in the memory unit. The file manager modifies sectors of existing data from the memory unit with new data collected by the host to form sectors of modified data.

The file system writes modified data into the memory unit by using an ATA read command for reading the existing data into the host from an intended operational sector in the memory unit; modifying the existing data in the host with the new data; using an ATA write command for erasing a data reserve sector and writing the modified data into the data reserve sector; using an ATA write command for erasing a control reserve sector and writing control data including the location of the intended operational sector into the control reserve sector; using an ATA write command for erasing the intended operational sector and writing the modified data into the intended operational sector; and then using an ATA erase command for erasing the control reserve sector. If power is lost or the memory unit is disconnected during the ATA write to the intended operational sector, the existing data in the intended operational sector may be corrupted. However, the data reserve sector contains a copy of the modified data. At power up or when the memory unit is inserted, a warning alert is generated. The warning alert triggers the file system to use an ATA read command to check the control reserve sectors for non-erased data. When non-erased control data is found, the host uses an ATA read command for reading the copy of the modified data in the corresponding data reserve sector into the host; and uses the ATA write command for erasing and then writing the modified data into the intended operational sector at the location specified in the control data, thereby avoiding the loss of the existing data that was previously stored in the memory unit.

An advantage of the present invention is that an MS DOS WINDOWS compatible file system using the ATA protocol avoids the loss of data in a memory unit when power is lost or the memory unit is removed while writing new data to the memory unit.

Another advantage of the present invention is that the loss of existing data in a memory unit is avoided in the event that the main power goes down without the need for a backup power source for operating the host and/or the memory unit during a process of writing data to the memory unit.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
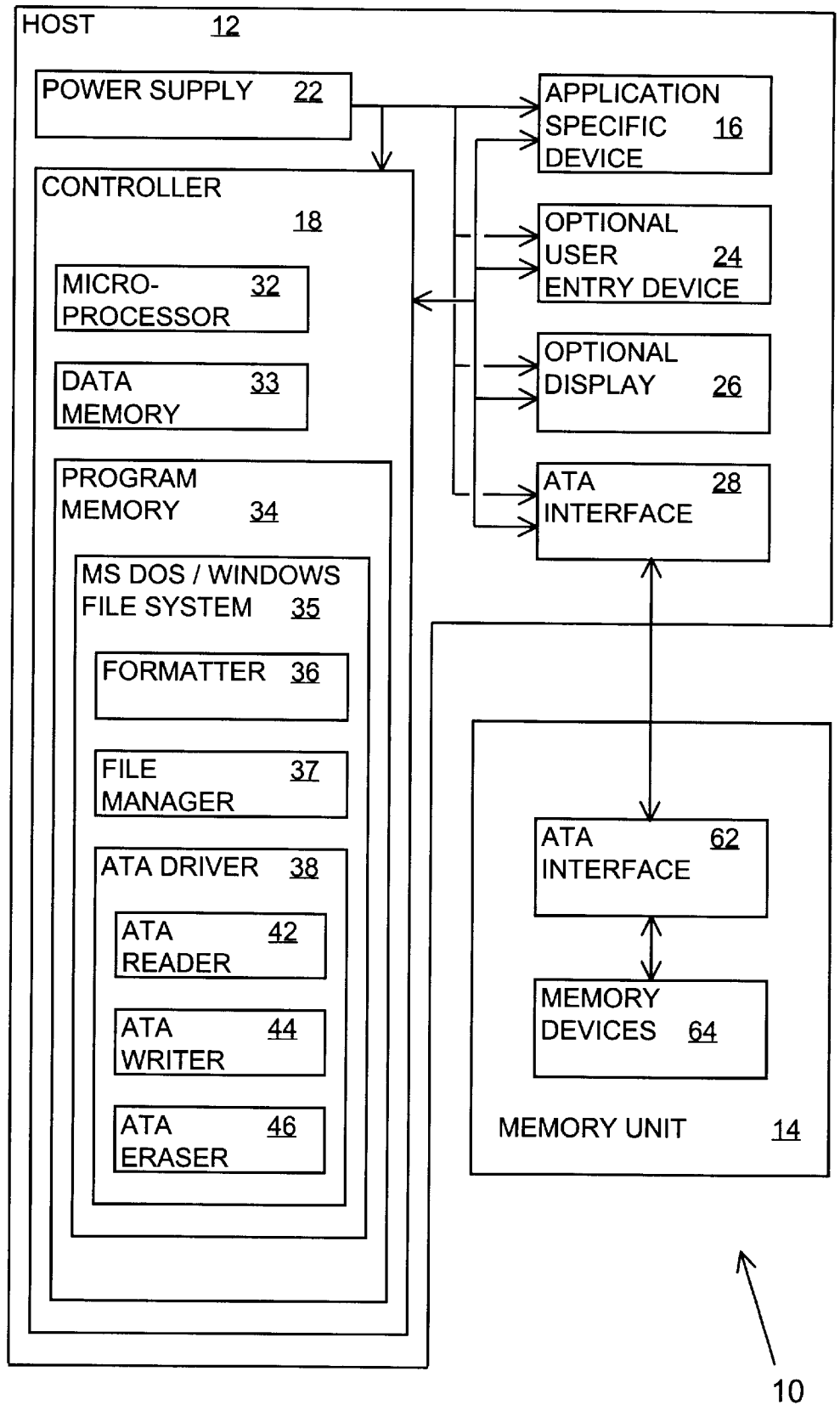
FIG. 1 is a block diagram of a system including a host of the present invention and a memory unit.

FIG. 1 is a block diagram of a MICROSOFT (MS) disk operating system (DOS) and WINDOWS compatible system of the present invention referred to by the general reference number 10. The system 10 includes a host 12 and an AT attachment (ATA) compatible memory unit 14. The host 12 includes an application specific device 16 such as a digital camera, a palmtop computer, a personal computer, a global positioning system receiver, or almost any device that generates data that needs to be stored. The host 12 also includes a controller 18, a power supply 22, an optional user entry device 24, an optional display 26, and an ATA interface 28. The power supply 22 supplies power for operating the host 12 and the memory unit 14. The user entry device 24 receives inputs from a user. The display 26 displays information to a user. The interface 28 includes hardware for passing signals between the host 12 and the memory unit 14 and passing power from the host 12 to the memory unit 14. The host 12 may or may not actually run MS DOS or WINDOWS applications programs. However, the host 12 meets MS DOS and/or MS WINDOWS and ATA requirements for communicating with the memory unit 14 for storing and retrieving data. In a preferred embodiment, the host 12 is a global positioning system surveyor, the applications specific device 16 is a global positioning system receiver, the user entry device 24 is a power on-off key, and the display 26 is five light emitting diodes for displaying the status of the system 10. In the minimum case, no user entry device 24 or display 26 is required.

The controller 18 includes a microprocessor 32, a data memory 33, a program memory 34, and associated hardware. The data memory 33 provides temporary storage of data from the memory unit 14 that is being modified by new data from the application specific device 16. The modified data is then passed to the memory unit 14 for long term storage. The microprocessor 32 operates in a conventional manner for reading instructions in the program memory 34 and coordinating the activities of the memory unit 14, the application specific device 16, the user entry device 24, the display 26, the interface 28, and the data memory 33. Of course, the host 12 can be implemented with an embodiment where the application specific device 16 uses the controller 18, the data memory 33, and/or the program memory 34 for processing the application or the host 12 uses the controller 18, the data memory 33, and/or the program memory 34 embedded as a part of the application specific device 16.

The program memory 34 includes an MS DOS and WINDOWS compatible file system 35 including a formatter 36 for formatting the memory unit 14 in an MS DOS and WINDOWS compatible format, an MS DOS or WINDOWS compatible file manager 37 for managing data files and control data, and an ATA driver 38. The ATA driver 38 includes programming for an ATA reader 42, an ATA writer 44, and an ATA eraser 46 for reading, writing, and erasing data, respectively, through the interface 28 to the memory unit 14.

Figure 2:
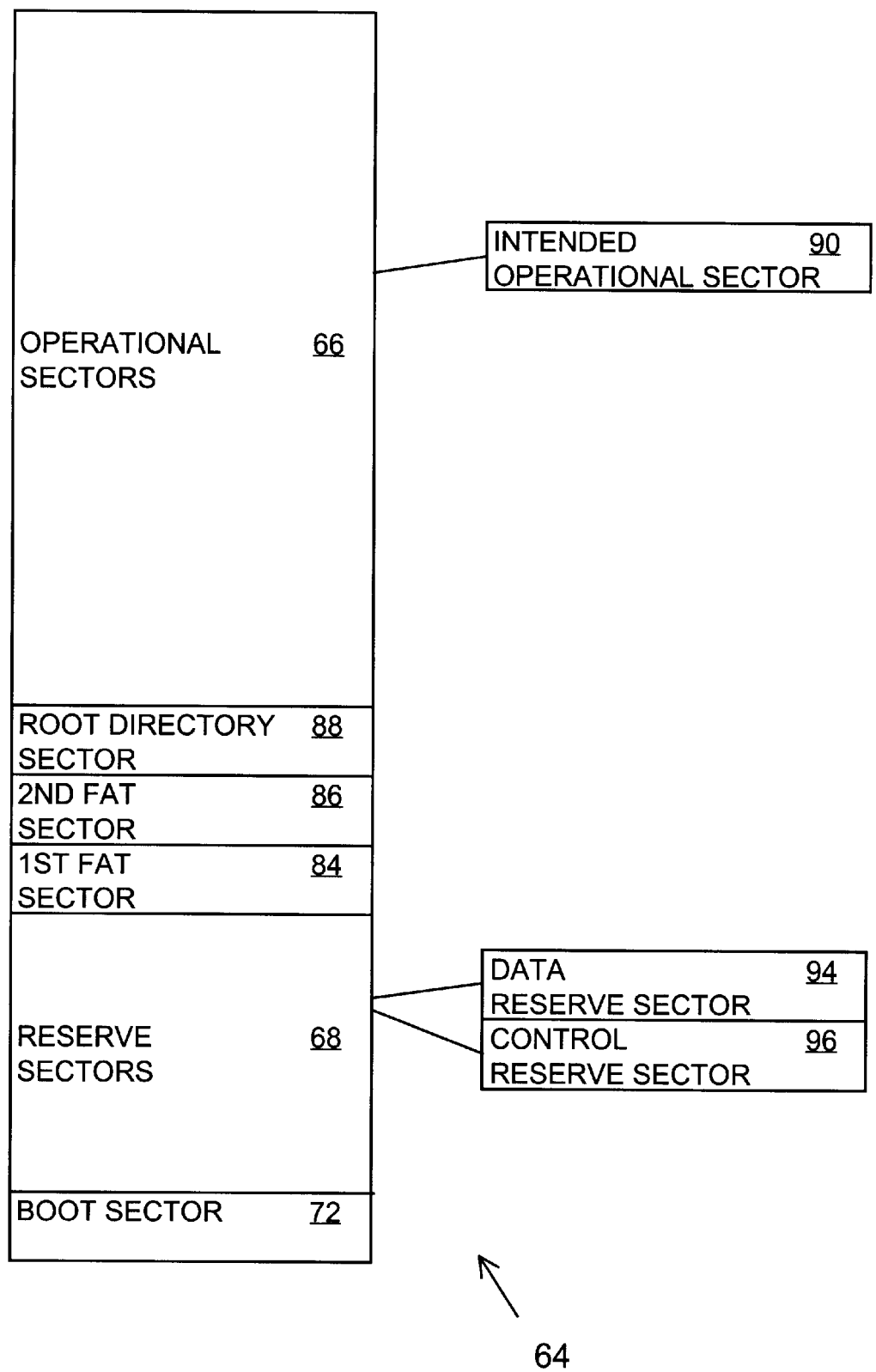
FIG. 2 is a data structure diagram for the memory unit of FIG. 1.

The memory unit 14 includes an ATA interface 62 and one or more memory devices 64. The interface 62 connects to the interface 28 in the host 12 for receiving operating power from the power supply 22, receiving commands from the controller 18, passing status back to the controller 18, and receiving and issuing data. The memory devices 64 can be one or more disk memories, flash memory chips, static random access memory (SRAM) chips, or the like. The formatter 36 includes programming for formatting the memory unit 14 into operational sectors 66 and reserve sectors 68 as illustrated in FIG. 2 and described in the accompanying detailed description below. The operational sectors 66 store data generated in the application specific device 16. The reserve sectors 68 provide temporary storage of modified data for the application and control data while the modified application data is being written into the operational sectors 66. The file manager 37 stores information for the locations of the operational sectors 66 and the reserve sectors 68 for the memory unit 14 that is currently installed in the host 12. The file manager 37 also generates the control data that is written to the memory unit 14, issues a warning alert in response to a power up or insertion of the memory unit 14, and tests validity for the control data that is read from the memory unit 14 in response to the warning alert. The ATA driver 38 initiates a write command by writing into registers in the ATA interface 28 a write indication, the logical address of the sector, and a sector count for the number of sectors of data to be written. The memory unit 14 responds with an interrupt when it is ready. Then the ATA driver 38 writes the data in the registers.

Memory devices 64 using flash memory have a limited lifetime, typically 100,000 to 1,000,000 erasure cycles, at the date of this application. Depending upon the particular type, the memory unit 14 may include hardware and/or software for wear leveling. However, for the possibility that the memory unit 14 does not include internal wear leveling, optionally, the file manager 37 uses the ATA driver 38 with a wear leveling technique to spread erase-write cycles evenly among individual sectors in the reserve sectors 68. Because at least two of the reserve sectors 68 will be used each time new data is written to any of the operational sectors 66 it may be important to allocate enough sectors in the reserve sectors 68 so that the memory unit 14 does not wear out prematurely. On the other hand, increasing the number of reserve sectors 66 decreases the amount of data that can be stored in the operational sectors 66. The maximum number of the reserve sectors 68 in MS DOS or MS WINDOWS is 254. In a preferred embodiment, a memory unit 14 having 4M bytes allocates about 254 sectors or about 127K bytes as reserve sectors 68.

FIG. 2 is a data structure diagram for the memory unit 14 formatted by the formatter 36. The memory unit 14 is formatted by the formatter 36 into sectors. In a preferred embodiment, the size of the sectors is 512 bytes, however, other sizes can be used. The sectors are arranged in a linear array starting at logical sector memory address "0" and extending to the capacity of the memory unit 14. The formatter 36 identifies the location of sectors or groups of sectors by writing information into a boot sector 72 when the memory unit 14 is formatted. The first sector starting at logical sector memory address "0" is the boot sector 72. The thirty-eighth byte of the boot sector 72 labeled "bsReserved1" defines the number of reserve sectors 68.

The next sectors logically above the boot sector 72 are the reserve sectors 68. The next sectors above the reserve sectors 68 are a first file allocation table (FAT) sector 84 and a second FAT sector 86. The FAT sectors 84, 86 include pointers to the operational sectors 66 for the locations of data files. Next above the FAT sectors 84, 86 is a root directory 88. It should be noted that by marking the location of the reserve sectors 68 when formatting the boot sector 72, the logical sector addresses of the reserve sectors 68 are effectively hidden from the FAT sectors 84, 86 and the root directory 88. The next sectors above the root directory 88 are the operational sectors 66 where the data in the data files generated by the application specific device 16 is stored. An exemplary one of the operational sectors 66, termed an intended operational sector 90, is the logical location of the existing data that is to be modified with new data and the logical destination location of the modified data.

The reserve sectors 68 are grouped in blocks. Each block includes a data reserve sector 94 and a control reserve sector 96. The data reserve sector 94 stores modified data temporarily while the modified data is being written into the intended operational sector 90. The control reserve sector 96 stores control data for the location of the intended operational sector 90, a signature word, and validity check data, such as a checksum, for the control data. The ATA driver 38 is coupled to the file manager 37 for maintaining an array of pointers to the reserve sectors 68 starting immediately after the boot sector 72 and continuing to the sector immediately preceding the first FAT 84. In an MS DOS and WINDOWS formatted memory unit 14 these reserve sectors 68 are ignored by the first and second FAT sectors 84, 86 and the root directory 88 so there is no way for data intended for operational sectors to overflow into the reserve sectors 68.

Figure 3:
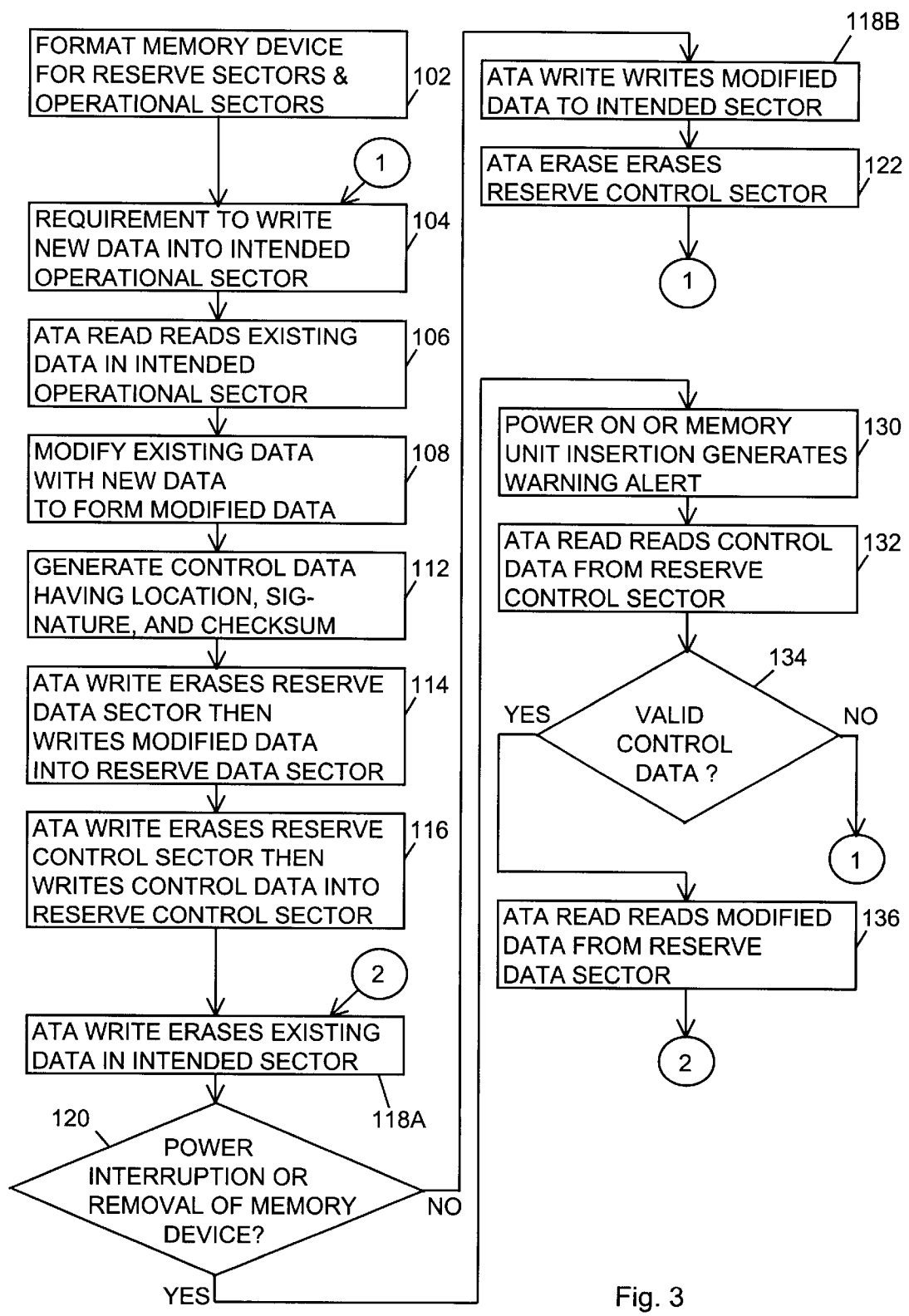
FIG. 3 is a flow chart of a method using an MS DOS and WINDOWS compatible file system of the present invention in the host of FIG. 1 for writing data into the memory unit of FIGS. 1 and 2.

FIG. 3 is a flow chart of a method in the system 10 for writing new data from the host 12 into the memory unit 14. At the start, in a step 102 the formatter 36 formats the memory unit 14 into the sectors as illustrated in FIG. 2 and described above. The first time the host 12 opens a memory unit 14 that has been formatted, the file manager 37 reads the boot sector 72 to determine the locations of the FAT sectors 84, 86, root directory 88, operational sectors 66; and notes the existence and location of the reserve sectors 68. Then, in an event 104 the application specific device 16 generates new data and a requirement to write the new data into the memory unit 14.

In order to write the new data into the intended operational sector 90 without the possibility of losing the existing data in the memory unit 14 that might otherwise occur due to a power outage or removal of the memory unit 14 from the host 12, the host 12 uses the reserve sectors 68 for temporary data storage as described below. In a step 106 the host 12 uses an ATA read command for reading the existing data from the intended operational sector 90. In a step 108 the host 12 modifies the existing data with the new data to form modified data. In a step 112 the file manager 37 in the host 12 generates control data having the memory location of the intended operational sector 90, a signature string, and validity check data for the control data. In a step 114 the host 12 uses an ATA write command for erasing the data reserve sector 94 and then writing the modified data into the data reserve sector 94. In a step 116 the host 12 uses an ATA write command for erasing the control reserve sector 96 and then writing the control data into the control reserve sector 96. If power is lost or the memory unit 14 is removed while writing to the reserve sectors 68 during the steps 114 and 116, the new data may be lost but the existing data in the intended operational sector 90 is retained unharmed. In a step 118A and then a step 118B the host 12 uses an ATA write command for erasing the intended operational sector 90 and then writing the modified data into the intended operational sector 90, respectively. The modified data in the intended operational sector 90 is corrupted if, in an event 120, the memory unit 14 is disconnected from the host 12 or is power goes down in either the host 12 or the memory unit 14 at any time between the beginning of the step 118A and the end of the step 118B. In a step 122, in normal operation with no power outage or removal of the memory unit 14, the host 12 uses an ATA erase command for erasing the control reserve sector 96. Then, the process of writing new data into the intended operational sector 90 can be begun again at the event 104.

In the event 120 when power was interrupted or the memory unit 14 was removed, the host 12 recovers the modified data from the reserve sectors 66 as described below. In the event 130 the file manager 37 in the host 12 detects a power up or an insertion of the memory unit 14 and generates a warning alert. Insertion of the memory unit 14 may be detected when an input to the ATA interface 28 normally pulled high is grounded by the memory unit 14. In a step 132 the host 12 uses the warning alert of the event 130 of power up or insertion for triggering an ATA read command for reading control data from the control reserve sectors 96. In a step 134 the file manager 37 checks the signature and uses the validity check data for testing that the control data is non-erased with valid data. If the control data is not valid, the host uses an ATA read command for reading and checking the next control reserve sector 96. When the control data in all the control reserve sectors 96 has been checked and found not valid, the process of writing new data can be begun again at the event 104.

If the control data and the signature in the control reserve sector 96 is valid, there is a good chance that the data in the intended operational sector 90 was corrupted due to a power outage or memory unit 12 removal in the event 120. Given that the data is possibly corrupted, the host 12 in a step 136 uses an ATA read command to read the modified data from the temporary storage in the associated data reserve sector 94. Then, the process of writing the modified data to the intended operational sector 90 is begun again starting at the step 118A. There is a small chance that the valid checksum in the step 134 is a result of a power outage or memory unit 14 removal while erasing the control reserve sector 96 during the step 122. In this case the modified data in the associated data reserve sector 94 will be unnecessarily but harmlessly written into the intended operational sector 90 beginning at the step 118A.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for managing data files and avoiding loss of data in a memory unit when operating power is interrupted or said memory unit is disconnected from a host while said host is writing data to said memory unit, comprising steps of:

formatting said memory unit in one of (i) an MS DOS and (ii) an MS WINDOWS format having reserve sectors and operational sectors;

organizing said reserve sectors into data sectors and associated control sectors;

using a first AT attachment (ATA) write command for writing modified data from said host into a data sector of said reserve sectors;

after writing said modified data into said data sector, using a second ATA write command for writing said modified data from said host into an intended one of said operational sectors;

within said host, generating control data having information for a location of said intended operational sector and validity check data;

before using said second ATA write command, using a third ATA write command for writing said control data into a one of said control sectors;

after writing said modified data into said intended operational sector using an ATA erase command for erasing said control sector unless a warning alert is received after said first ATA write command;

in the event that said warning alert is received, responding to said warning alert by using a second ATA read command for reading said control data in said control sector into said host; and when said validity check data indicates said control data is valid using a third ATA read command for reading said modified data in said data sector into said host and using a fourth ATA write command for writing said modified data from said host into said intended operational sector.

2. The method of claim 1, further comprising steps of:

before using said first ATA write command, using a first ATA read command for reading said intended operational sector having existing data into said host; and within said host, modifying said existing data according to new data for forming said modified data.

3. A program memory having an executable code readable by a host for directing said host for avoiding loss of existing data in a memory unit when operating power is interrupted or said memory unit is disconnected while writing data from said host to said memory unit, comprising:

a formatter for formatting said memory unit in one of (i) an MS DOS or (ii) an MS WINDOWS format having reserve sectors and operational sectors;

an AT attachment (ATA) driver for using a first ATA write command for writing modified data from said host into a data sector of said reserve sectors; and then using a second ATA write command for writing said modified data from said host into an intended one of said operational sectors, wherein the ATA driver, before using said first ATA write command, using a first ATA read command for reading said intended operational sector having existing data into said host;

a file manager coupled to the ATA driver for modifying said existing data according to new data for forming said modified data, the file manager organizing said reserve sectors into data sectors and associated control sectors and generating control data having information for a location of the intended operational sector and validity check data; and the ATA driver, before using said second ATA write command, using a third ATA write command for writing said control data into a one of said control sectors; and wherein:

the ATA driver, after writing said modified data into said intended operational sector, uses an ATA erase command for erasing said control sector unless a warning alert is received after said first ATA write command; in the event that said warning alert is received, uses a second ATA read command in response to a warning alert for reading said control data in said control sector into said host; and then when said validity check data indicates said control data is valid after erasing said control sector, uses a third ATA read command for reading said modified data in said data sector into said host and uses a fourth ATA write command for writing said modified data from said host into said intended operational sector, wherein valid validity check data indicates said intended operational sector might have been corrupted.

4. A host for avoiding loss of data in a memory unit when operating power is interrupted or said memory unit is disconnected from the host while the host is writing data to said memory unit, comprising:

an application specific device for generating new data;

a controller including a formatter for formatting said memory unit in one of (i) an MS DOS or (ii) an MS WINDOWS format having reserve sectors and operational sectors; and an AT attachment (ATA) driver for using a first ATA write command for writing modified data from the host into a data sector of said reserve sectors; and then using a second ATA write command for writing said modified data from the host into an intended one of said operational sectors, wherein said modified data is existing data modified by said new data, wherein the ATA driver, before using said first ATA write command, using a first ATA read command for reading said intended operational sector having said existing data into the host;

a file manager coupled to the ATA driver for modifying said existing data according to said new data for forming said modified data, the file manager organizing said reserve sectors into data sectors and associated control sectors and generating control data having information for a location of said intended operational sector and validity check data; and the ATA driver, before using said second ATA write command, using a third ATA write command for writing said control data into a one of said control sectors; and wherein:

the ATA driver, after writing said modified data into said intended operational sector, uses an ATA erase command for erasing said control sector unless a warning alert is received after said first ATA write command; in the event that said warning alert is received, uses a second ATA read command in response to a warning alert for reading said control data in said control sector into the host; and then, when said validity check data indicates said control data is valid after erasing said control sector, uses a third ATA read command for reading said modified data in said data sector into the host and uses a fourth ATA write command for writing said modified data from the host into said intended operational sector, wherein valid validity check data indicates said intended operational sector might have been corrupted.

5. A method for managing data files and avoiding loss of data in a memory unit when operating power is interrupted or said memory unit is disconnected from a host while said host is writing data to said memory unit, comprising steps of:

formatting said memory unit in one of (i) an MS DOS and (ii) an MS WINDOWS format having reserve sectors and operational sectors;

using a first AT attachment (ATA) write command for writing modified data from said host into a data sector of said reserve sectors;

after writing said modified data into said data sector, using a second ATA write command for writing said modified data from said host into an intended one of said operational sectors;

organizing said reserve sectors into data sectors and associated control sectors;

within said host, generating control data having information for a location of said intended operational sector and validity check data; and before using said second ATA write command, using a third ATA write command for writing said control data into a one of said control sectors; wherein:

said control sector is written to only one time for any one set of modified data to be written into said intended operational sector.

6. The method of claim 5, further comprising steps of:

before using said first ATA write command, using a first ATA read command for reading said intended operational sector having existing data into said host; and within said host, modifying said existing data according to new data for forming said modified data.

7. A program memory having an executable code readable by a host for directing said host for avoiding loss of existing data in a memory unit when operating power is interrupted or said memory unit is disconnected while writing data from said host to said memory unit, comprising:

a formatter for formatting said memory unit in one of (i) an MS DOS or (ii) an MS WINDOWS format having reserve sectors and operational sectors;

an AT attachment (ATA) driver for using a first ATA write command for writing modified data from said host into a data sector of said reserve sectors; and then using a second ATA write command for writing said modified data from said host into an intended one of said operational sectors, the ATA driver, before using said first ATA write command, using a first ATA read command for reading said intended operational sector having existing data into said host;

a file manager coupled to the ATA driver for modifying said existing data according to new data for forming said modified data, the file manager organizing said reserve sectors into data sectors and associated control sectors and generating control data having information for a location of the intended operational sector and validity check data; and the ATA driver, before using said second ATA write command, using a third ATA write command for writing said control data into a one of said control sectors; wherein:

said control sector is written to only one time for any one set of modified data to be written into said intended operational sector.

8. A host for avoiding loss of data in a memory unit when operating power is interrupted or said memory unit is disconnected from the host while the host is writing data to said memory unit, comprising:

an application specific device for generating new data;

a controller including a formatter for formatting said memory unit in one of (i) an MS DOS or (ii) an MS WINDOWS format having reserve sectors and operational sectors; and an AT attachment (ATA) driver for using a first ATA write command for writing modified data from the host into a data sector of said reserve sectors; and then using a second ATA write command for writing said modified data from the host into an intended one of said operational sectors, wherein said modified data is existing data modified by said new data, the ATA driver, before using said first ATA write command, using a first ATA read command for reading said intended operational sector having said existing data into the host;

a file manager coupled to the ATA driver for modifying said existing data according to said new data for forming said modified data, the file manager organizing said reserve sectors into data sectors and associated control sectors and generating control data having information for a location of said intended operational sector and validity check data; and the ATA driver, before using said second ATA write command, using a third ATA write command for writing said control data into a one of said control sectors; wherein:

said control sector is written to only one time for any one set of modified data to be written into said intended operational sector.

* * * * *